(12) United States Patent
Jiang et al.

(10) Patent No.: US 12,409,732 B2
(45) Date of Patent: Sep. 9, 2025

(54) ENVIRONMENT TEMPERATURE DETERMINATION METHOD, MOTOR CONTROL UNIT, CONTROL SYSTEM, AND STORAGE MEDIUM

(71) Applicant: GREAT WALL MOTOR COMPANY LIMITED, Baoding (CN)

(72) Inventors: Zhe Jiang, Baoding (CN); Xinran Dong, Baoding (CN); Fuqiang Xu, Baoding (CN); Yushan Li, Baoding (CN)

(73) Assignee: GREAT WALL MOTOR COMPANY LIMITED, Hebei (CN)

( * ) Notice: Subject to any disclaimer, the term of this patent is extended or adjusted under 35 U.S.C. 154(b) by 661 days.

(21) Appl. No.: 17/758,242

(22) PCT Filed: Apr. 8, 2021

(86) PCT No.: PCT/CN2021/085882
§ 371 (c)(1),
(2) Date: Jun. 30, 2022

(87) PCT Pub. No.: WO2021/204178
PCT Pub. Date: Oct. 14, 2021

(65) Prior Publication Data
US 2023/0052138 A1 Feb. 16, 2023

(30) Foreign Application Priority Data
Apr. 8, 2020 (CN) .......................... 202010270328.0

(51) Int. Cl.
*B60L 1/08* (2006.01)
*B60L 58/10* (2019.01)

(52) U.S. Cl.
CPC ................. *B60L 1/08* (2013.01); *B60L 58/10* (2019.02); *B60L 2240/545* (2013.01)

(58) Field of Classification Search
CPC ...... B60L 1/08; B60L 58/10; B60L 2240/545; B60L 1/003; B60L 1/02; B60L 2240/425; B60L 15/20; Y02T 10/70; Y02T 10/72
(Continued)

(56) References Cited

U.S. PATENT DOCUMENTS 4,527,247 A * 7/1985 Kaiser ...................... A01G 9/26
710/1
5,838,591 A * 11/1998 Yamaguchi ............ H02H 6/005
361/28

(Continued)

FOREIGN PATENT DOCUMENTS

| CN | 103625396 | 3/2014 |
| CN | 104070959 | 10/2014 |

(Continued)

OTHER PUBLICATIONS

CNIPA, First Office Action for CN Application No. 202010270328.0, Sep. 8, 2021.

(Continued)

*Primary Examiner* — M Baye Diao
(74) *Attorney, Agent, or Firm* — Hodgson Russ LLP (57) ABSTRACT

A motor control unit, a control system, and a storage medium. The method of the present invention is applied to the motor control unit and comprises: when a vehicle is in a high-voltage power-on state, obtaining a plurality of effective temperature values for the same motor system; determining a corresponding initial temperature value according to each effective temperature value; determining the minimum value among all calculated initial temperature values as an initial environment temperature; when the vehicle is in a driving state and each initial temperature value is less than or equal to respective corresponding threshold, and the current temperature of a motor no longer rises, calculating differences between the current tempera- (Continued)

ture of the motor and the corresponding initial temperature value and between the current temperature of a cooling liquid and the corresponding initial temperature value; calculating a temperature calibrate amount for the environment temperature according to the calculated differences.

15 Claims, 3 Drawing Sheets

(58) Field of Classification Search
USPC .......................................................... 320/150
See application file for complete search history.

(56) References Cited

U.S. PATENT DOCUMENTS

| | | | | |
|---|---|---|---|---|
| 6,088,661 | A * | 7/2000 | Poublon | G01K 1/00 |
| | | | | 73/114.34 |
| 6,467,695 | B1 * | 10/2002 | Riley | F24F 11/30 |
| | | | | 62/332 |
| 7,069,141 | B2 * | 6/2006 | Kunz | F01M 5/005 |
| | | | | 701/115 |
| 9,008,891 | B2 * | 4/2015 | Houle | B60W 20/50 |
| | | | | 180/65.28 |
| 9,145,057 | B2 * | 9/2015 | Jung | B60L 1/20 |
| 9,233,614 | B2 * | 1/2016 | Imamura | B60L 50/50 |
| 10,005,454 | B2 * | 6/2018 | Matsumura | B60L 50/15 |
| 10,608,443 | B2 | 3/2020 | Thompson et al. | |
| 2016/0031340 | A1 * | 2/2016 | Porras | H01M 10/625 |
| | | | | 429/62 |
| 2019/0058336 | A1 * | 2/2019 | Thompson | H01M 10/443 |

FOREIGN PATENT DOCUMENTS

| | | | | |
|---|---|---|---|---|
| CN | 104653316 | | 5/2015 | |
| CN | 105022904 | | 11/2015 | |
| CN | 108928192 | | 12/2018 | |
| JP | 2012209993 | A * | 10/2012 | ............ Y02T 10/72 |
| KR | 20070117262 | | 12/2007 | |
| WO | 2019088830 | | 5/2019 | |

OTHER PUBLICATIONS

WIPO, International Search Report for PCT/CN2021/085882, Jul. 2, 2021.

EPO, Extended European Search Report for EP Application No. 21785075.9, Dec. 22, 2022.

* cited by examiner

ENVIRONMENT TEMPERATURE DETERMINATION METHOD, MOTOR CONTROL UNIT, CONTROL SYSTEM, AND STORAGE MEDIUM

CROSS-REFERENCE TO RELEVANT APPLICATIONS

The present application is a U.S. national stage entry of International Application No. PCT/CN2021/085882, filed Apr. 8, 2021, which claims priority to Chinese Patent Application No. 202010270328.0, filed Apr. 8, 2020, the entire disclosures of which are incorporated herein by reference.

TECHNICAL FIELD

The present disclosure relates to the technical field of vehicles, and more particularly, to an ambient temperature determination method, a motor control unit, a control system, and a storage medium.

BACKGROUND

The ambient temperature is a very important parameter in the existing vehicle control technology, and a vehicle and a plurality of control units corresponding to its components (e.g., a vehicle air-conditioning control unit) are required to obtain the ambient temperature to execute a corresponding control strategy. At present, the ambient temperature is mainly collected by mounting an ambient temperature sensor on the vehicle body, however, this solution may not only increase the vehicle cost, but also may affect the vehicle wiring.

SUMMARY

In view of this, the present disclosure is directed to an ambient temperature determination method to solve the existing problem of collection of an ambient temperature depending on an ambient temperature sensor.

In order to achieve the aforementioned object, the technical solution of the present disclosure is implemented as follows.

An ambient temperature determination method is applied to an MCU of a vehicle, and the ambient temperature determination method includes: when the vehicle is in a high-voltage power-on state, obtaining a plurality of valid temperature values for the same motor system, that is, an valid motor temperature value, an valid battery temperature value, an valid MCU temperature value, and an valid coolant temperature value; determining a corresponding initial temperature value according to each valid temperature value, including: an initial motor temperature value, an initial battery temperature value, an initial MCU temperature value, and an initial coolant temperature value; determining a minimum value among all the calculated initial temperature values as an initial ambient temperature; when the vehicle is in a driving state and each initial temperature value is less than or equal to a corresponding threshold, obtaining a current motor temperature and a current coolant temperature in real time, and when the current motor temperature no longer rises, calculating a motor temperature difference between the current motor temperature and the corresponding initial temperature value and a coolant temperature difference between the current coolant temperature and the corresponding initial temperature value; calculating a temperature calibration for an ambient temperature according to the motor temperature difference and the coolant temperature difference, wherein the motor temperature difference, the coolant temperature difference and the temperature calibration have a pre-configured association relationship; and calculating a current ambient temperature on the basis of the temperature calibration and the initial ambient temperature.

Further, the obtaining a plurality of valid temperature values for the same motor system includes: acquiring the plurality of valid temperature values within a set time; when the vehicle is in the high-voltage power-on state, enabling a preset counter to obtain the plurality of valid temperature values consistent with a set count of the counter; or when the vehicle is in the high-voltage power-on state, acquiring a vehicle stationary time from a vehicle control unit, so as to obtain the plurality of valid temperature values within the vehicle stationary time.

Further, the determining a corresponding initial temperature value according to each valid temperature value includes: calculating an average value of the obtained valid temperature values as the initial motor temperature value, the initial battery temperature value, the initial MCU temperature value, and the initial coolant temperature value, respectively.

Further, the association relationship among the motor temperature difference, the coolant temperature difference and the temperature calibration is configured as the following equation:

$$Temp_{err} = (TM_{temperr} - K \times CW_{temperr}) \times \begin{bmatrix} K_1 & K_2 \\ K_3 & K_4 \end{bmatrix}$$

where $Temp_{err}$ represents the temperature calibration, $TM_{temperr}$ represents the motor temperature difference, $CW_{temperr}$ represents the coolant temperature difference, K is a weight coefficient, and $$\begin{bmatrix} K_1 & K_2 \\ K_3 & K_4 \end{bmatrix}$$

is a calibration parameter in different temperature ranges.

Further, the ambient temperature determination method also includes: calculating an ambient temperature difference between the current ambient temperature and the initial ambient temperature; and when the ambient temperature difference is greater than a set threshold, determining a previous ambient temperature corresponding to the current ambient temperature as a finally determined ambient temperature.

The ambient temperature determination method disclosed in the present disclosure has the following advantages over the prior art: the ambient temperature determination method of the present disclosure can realize the detection of an ambient temperature without adding an ambient temperature sensor, thereby reducing the vehicle cost, optimizing the vehicle wiring, and expanding the function of an MCU.

Another object of the present disclosure is to propose a machine-readable storage medium to solve the existing problem of collection of an ambient temperature depending on an ambient temperature sensor.

In order to achieve the aforementioned object, the technical solution of the present disclosure is implemented as follows.

A machine-readable storage medium has instructions stored thereon for causing a machine to perform the aforementioned ambient temperature determination method.

The machine-readable storage medium has the same advantages over the prior art as the aforementioned ambient temperature determination method, and descriptions thereof will be omitted here.

Another object of the present disclosure is to propose an MCU to solve the existing problem of collection of an ambient temperature depending on an ambient temperature sensor.

In order to achieve the aforementioned object, the technical solution of the present disclosure is implemented as follows.

An MCU is configured to execute a program which, when executed, performs the ambient temperature determination method as described above.

The MCU has the same advantages over the prior art as the aforementioned ambient temperature determination method, and descriptions thereof will be omitted here.

Another object of the present disclosure is to propose a control system applying an ambient temperature to solve the existing problem of collection of an ambient temperature depending on an ambient temperature sensor.

In order to achieve the aforementioned object, the technical solution of the present disclosure is implemented as follows.

A control system applying an ambient temperature includes: the aforementioned MCU, configured to determine an ambient temperature of a vehicle; and a vehicle control unit, configured to obtain the ambient temperature from the MCU to perform vehicle control.

Further, the control system applying an ambient temperature also includes: a temperature detection apparatus, adapted to be mounted to a motor, the motor MCU and a battery for detecting a motor temperature, a battery temperature, an MCU temperature, and a coolant temperature for the same motor and transmitting the temperatures to the MCU.

Further, the control system applying an ambient temperature also includes: a counter, adapted to be mounted to the MCU for setting the number of a plurality of valid temperature values, obtained by the MCU, for the same motor.

The control system applying an ambient temperature has the same advantages over the prior art as the aforementioned ambient temperature determination method, and descriptions thereof will be omitted here.

Other features and advantages of the present disclosure will be set forth in detail in the detailed description of the embodiments which follows.

The above description is merely a summary of the technical solutions of the present disclosure. In order to more clearly know the technical means of the present disclosure to enable the implementation according to the contents of the description, and in order to make the above and other purposes, features and advantages of the present disclosure more apparent and understandable, the particular embodiments of the present disclosure are provided below.

BRIEF DESCRIPTION OF THE DRAWINGS

In order to more clearly illustrate the technical solutions of the embodiments of the present disclosure or the related art, the drawings required to describe the embodiments or the related art will be briefly introduced below. Apparently, the drawings described below are merely some embodiments of the present disclosure, and those ordinarily skilled in the art may obtain other drawings according to these drawings without paying creative work.

The accompanying drawings, constituting a part of the present disclosure, are used to provide a further understanding of the present disclosure. Exemplary implementations of the present disclosure and the description thereof are used to explain the present disclosure, but do not constitute improper limitations to the present disclosure. In the drawings.

DETAILED DESCRIPTION OF THE EMBODIMENTS

In order to make the purposes, technical solutions and advantages of the embodiments of the present disclosure more apparent, the technical solutions in the embodiments of the present disclosure will be clearly and completely described below with reference to the drawings in the embodiments of the present disclosure. Apparently, the described embodiments are merely certain embodiments of the present disclosure, rather than all of the embodiments. All of the other embodiments obtained by those ordinarily skilled in the art on the basis of the embodiments of the present disclosure without paying creative work fall within the protection scope of the present disclosure.

It should be noted that the implementations of the present disclosure and the features of the implementations may be combined with each other without conflict.

The present disclosure will now be described in detail in connection with the implementations with reference to the accompanying drawings.

Figure 1:
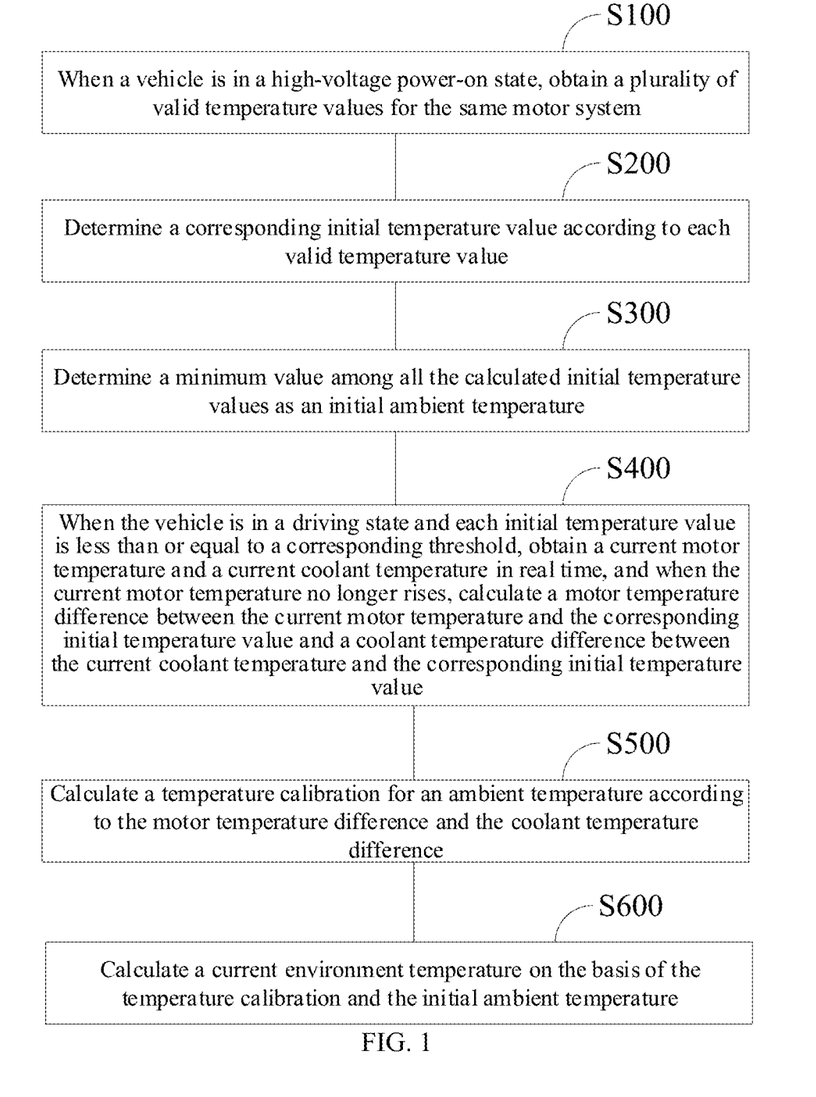
FIG. 1 is a flowchart of an ambient temperature determination method according to an embodiment of the present disclosure.

FIG. 1 is a flowchart of an ambient temperature determination method according to an embodiment of the present disclosure. As shown in FIG. 1, the ambient temperature determination method may include the following steps:

In step S100, when a vehicle is in a high-voltage power-on state, a plurality of valid temperature values for the same motor system: a valid motor temperature value, an valid battery temperature value, an valid MCU temperature value, and an valid coolant temperature value are obtained.

Here, a precondition for performing the ambient temperature determination method according to the embodiment of the present disclosure is that the vehicle is in the high-voltage power-on state at beginning. The purpose is to ensure that the corresponding obtained valid temperature value is a temperature value obtained within a stationary time of the engine cold start. Various components of the motor system do not start to operate within this time, and the corresponding temperature value is relatively stable and approximate to an ambient temperature, so as to be suitable for subsequently determining an initial ambient temperature.

A motor, a battery, an MCU, and a coolant are components of the same motor system. Moreover, the motor is configured to provide power. The battery is typically in the form of a module, referred to as a battery module, for supplying power to the motor and the MCU. The MCU is configured to adjust a rotation speed of the motor, etc. The coolant is a medium for reducing a motor temperature in a motor cooling system.

For example, the corresponding valid temperature value may be obtained by configuring corresponding temperature sensors for the motor, the battery, the MCU, and the coolant. In order to facilitate mounting or detection of the temperature sensors, a motor stator temperature may be taken as the motor temperature. Here, the valid temperature value refers to a valid temperature value obtained after filtering out obviously erroneous detected temperature values.

In addition, step S100 is required to obtain a plurality of valid temperature values for subsequent steps, respectively. In this regard, in a preferred embodiment, the number of valid temperature values obtained may be controlled by any of the following solutions:

(1) The plurality of valid temperature values within a set time are obtained.

For example, if the valid temperature value is obtained for every certain time period, the number of valid temperature values obtained may be determined by setting the number of time cycles included in a time period.

(2) When the vehicle is in the high-voltage power-on state, a preset counter is enabled to obtain the plurality of valid temperature values consistent with a set count of the counter.

For example, a counter is enabled to set a count, and each time the valid temperature value is obtained, the count is increased by 1, whereby the number of valid temperature values obtained can be controlled by setting the count of the counter in advance.

(3) When the vehicle is in the high-voltage power-on state, a vehicle stationary time is obtained from a vehicle control unit, so as to obtain the plurality of valid temperature values within the vehicle stationary time.

It should be noted that when the vehicle enters the high-voltage power-on state from the cold start, there is a stationary time when the vehicle is not started, and a vehicle control unit may record the stationary time of the vehicle. In the case where it is not necessary to explicitly determine the number of valid temperature values to be obtained, all the valid temperature values within the stationary time of the vehicle may be directly obtained.

In the following step, corresponding initial temperature values and an initial ambient temperature value will be determined on the basis of the plurality of valid temperature values obtained in step S100, and descriptions thereof will be omitted here.

In step S200, a corresponding initial temperature value is determined according to each valid temperature value, including: an initial motor temperature value, an initial battery temperature value, an initial MCU temperature value, and an initial coolant temperature value.

For example, a valid temperature value may be randomly selected directly from the plurality of valid temperature values as an initial temperature value, or a valid temperature value may be selected through a preset rule as an initial temperature value.

However, in a preferred embodiment, an average value of the obtained valid temperature values is calculated as the initial motor temperature value, the initial battery temperature value, the initial MCU temperature value, and the initial coolant temperature value, respectively. Thus, by averaging the plurality of valid temperature values obtained, it is possible to make the obtained initial temperature values closer to an actual temperature situation when the vehicle is in the high-voltage power-on state.

In step S300, a minimum value among all the calculated initial temperature values is determined as an initial ambient temperature.

For example, if the initial motor temperature value, the initial battery temperature value, the initial MCU temperature value, and the initial coolant temperature value are 45° C., 43° C., 42° C., and 41° C., respectively, a minimum value of 41° C. is taken as the initial ambient temperature.

In step S400, when the vehicle is in a driving state and each initial temperature value is less than or equal to a corresponding threshold, a current motor temperature and a current coolant temperature are obtained in real time, and when the current motor temperature no longer rises, a motor temperature difference between the current motor temperature and the corresponding initial temperature value and a coolant temperature difference between the current coolant temperature and the corresponding initial temperature value are calculated.

For example, it is determined whether the vehicle is in a driving state by determining whether the motor rotates. If yes, it is determined that the vehicle is in the driving state. In addition, thresholds corresponding to the initial motor temperature value, the initial battery temperature value, the initial MCU temperature value, and the initial coolant temperature value are set to 45° C., 45° C., 40° C., and 45° C., respectively. If the corresponding thresholds are exceeded, it indicates that the corresponding components may be in an abnormal operation. If the ambient temperature is continuously calculated, a correct result is not obtained, and therefore the calculation may be abandoned. Each threshold is a calibration value and may be set according to an actual situation. For example, according to the characteristic that the motor temperature generally does not exceed 45° C., the corresponding threshold is set to 45° C. In addition, since the calculated temperature difference fluctuates greatly if the motor temperature is constantly changed, the temperature difference will be calculated after the motor temperature is stabilized (no longer rises) in the embodiments of the present disclosure.

For another example, a motor temperature difference $TM_{temperr}$ and a coolant temperature difference $CW_{temperr}$ are calculated by the following equations (1) and (2) upon satisfying the above conditions:

$$TM_{temperr} = TM_{tempcurrent} - TM_{tempinit} \quad (1)$$

$$CW_{temperr} = CW_{tempcurrent} - CW_{tempint} \quad (2)$$

where $TM_{tempcurrent}$ represents the current motor temperature when the motor temperature no longer rises, $TM_{tempinit}$ represents the initial motor temperature value, $CW_{tempcurrent}$ represents the current coolant temperature, and $CW_{tempint}$ represents the initial coolant temperature value.

In step S500, a temperature calibration for an ambient temperature is calculated according to the motor temperature difference and the coolant temperature difference, wherein the pre-configured association relationship exists between the motor temperature difference, the coolant temperature difference and the temperature calibration.

That is, an association relationship among the motor temperature difference, the coolant temperature difference and the temperature calibration may be configured in advance. After calculating the motor temperature difference and the coolant temperature difference in step S400, a corresponding temperature calibration may be calculated according to the association relationship. The association relationship may be configured based on experience. For example, the association relationship is configured according to influence weights of the motor temperature difference and the coolant temperature difference value respectively on an ambient temperature calculation result.

However, in a preferred embodiment, continuing from equations (1) and (2) described above, the association relationship among the motor temperature difference, the coolant temperature difference and the temperature calibration is configured as the following equation (3):

$$Temp_{err} = (TM_{temperr} - K \times CW_{temperr}) \times \begin{bmatrix} K_1 & K_2 \\ K_3 & K_4 \end{bmatrix} \quad (3)$$

where $Temp_{err}$ represents the temperature calibration, K is a calibratable weight coefficient, and $$\begin{bmatrix} K_1 & K_2 \\ K_3 & K_4 \end{bmatrix}$$

is a calibration parameter in different temperature ranges.
For example:

|  | Temperature | | | | |
| --- | --- | --- | --- | --- | --- |
|  | 0 | 10 | 20 | 30 | 40 |
| Calibration value | 0.99 | 0.91 | 0.82 | 0.64 | 0.39 |

In step S600, a current ambient temperature is calculated on the basis of the temperature calibration and the initial ambient temperature.

For example, continuing from equation (3), the current ambient temperature Temp is calculated by the following equation (4):

$$Temp = Temp_{init} + Temp_{err} \quad (4)$$

where $Temp_{init}$ is the initial ambient temperature recorded in step S300.

Thus, by equation (4), it is possible to continuously calibrate the initial ambient temperature on the basis of the temperature calibration continuously varying with a real-time motor temperature and a real-time coolant temperature to obtain the corresponding current ambient temperature.

In a preferred embodiment, after step S600, the ambient temperature determination method may further include the following steps. An ambient temperature difference between the current ambient temperature and the initial ambient temperature is calculated. And when the ambient temperature difference is greater than a set threshold, a previous ambient temperature corresponding to the current ambient temperature is determined as a finally determined ambient temperature.

For example, if the calculated current ambient temperature is 20° C. and a difference of 20° C. from a corresponding initial ambient temperature of 40° C. is greater than a set threshold of 18° C., the current calculation result is invalid, and the current ambient temperature of 25° C. previously calculated is the finally calculated ambient temperature.

Figure 2:
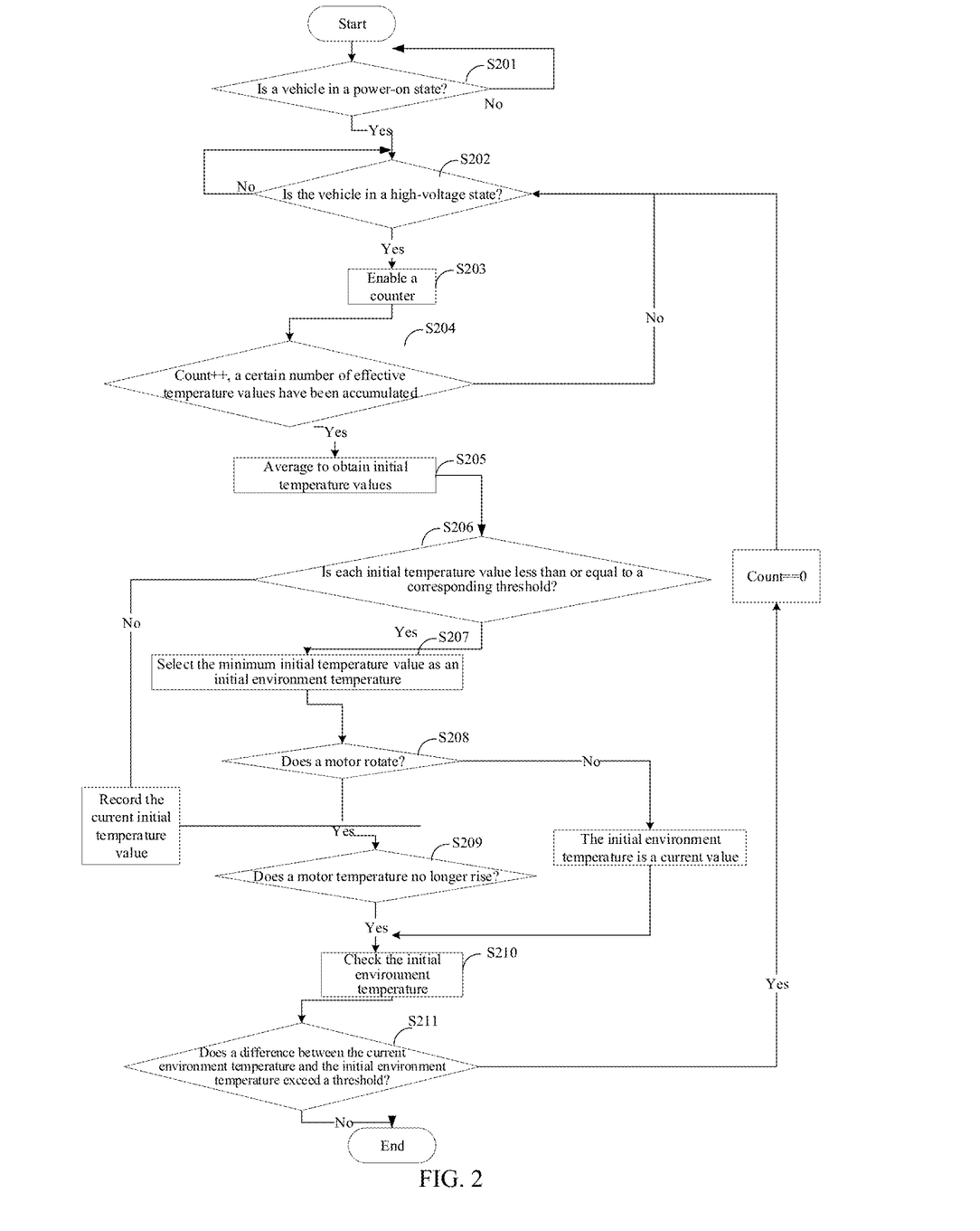
FIG. 2 is a flowchart of calculating an ambient temperature via an MCU in an example of an embodiment of the present disclosure.

The application of the ambient temperature determination method according to the embodiment of the present disclosure in the process from the cold start to the driving of the vehicle will now be described by way of example. FIG. 2 is a flowchart of calculating an ambient temperature via an MCU in an example of an embodiment of the present disclosure. As shown in FIG. 2, the example flow may include the following steps:

In step S201, it is determined whether a vehicle is in a power-on state; if yes, the next step is performed; otherwise, the determination is continued.

In step S202, it is determined whether the vehicle is in a high-voltage state; if yes, the next step is performed; otherwise, the determination is continued.

In step S203, each sensor temperature is read, and a counter is enabled for counting.

A quantity of counting is denoted as Count.

In step S204, it is determined whether a certain number of valid temperature values are accumulated; if yes, the next step is performed; otherwise, the process returns to step S202 for re-counting.

The valid temperature values are the aforementioned valid motor temperature value, valid battery temperature value, valid MCU temperature value, and valid coolant temperature value, and descriptions of the acquiring method therefor will be omitted here. In addition, the number of accumulated valid temperature values is controlled by controlling Count++.

In step S205, the valid temperature values are averaged to obtain initial temperature values.

The initial temperature values are the aforementioned initial motor temperature value, initial battery temperature value, initial MCU temperature value, and initial coolant temperature value, and descriptions of the obtaining method therefor will be omitted here.

In step S206, it is determined whether each initial temperature value is less than or equal to a corresponding threshold; if yes, step S207 is performed; otherwise, the current initial temperature value is recorded and the process proceeds to step 209.

For example, the step may include determining whether the following conditions are true (all in degrees Celsius):
1) The initial battery temperature value is less than or equal to 45 (calibration value).
2) The initial motor temperature value is less than or equal to 45 (calibration value).
3) The initial MCU temperature value is less than or equal to 40 (calibration value).
4) The initial coolant temperature value is less than or equal to 45 (calibration value).

In step S207, the minimum initial temperature value is selected as an initial ambient temperature.

In step S208, it is determined whether a motor rotates; if yes, the next step is performed; otherwise, the initial ambient temperature is determined as a current value, and the process proceeds to step 210.

In step S209, it is determined whether a motor temperature no longer rises; if yes, the next step is performed; otherwise, the flow is ended.

In step S210, the initial ambient temperature is calibrated to obtain a current ambient temperature.

The calibration may be performed by referring to equations (1) to (4) described above, and descriptions thereof will be omitted here.

In step S211, it is determined whether a difference between the current ambient temperature and the initial ambient temperature exceeds a threshold; if yes, the counter is reset and the process returns to step S202; otherwise, the flow is ended.

Therefore, in conjunction with examples, it can be seen that the ambient temperature determination method according to the embodiment of the present disclosure can realize the detection of an ambient temperature without adding an ambient temperature sensor, thereby reducing the vehicle cost, optimizing the vehicle wiring, and expanding the function of an MCU.

Another embodiment of the present disclosure provides an MCU for executing a program which, when executed, performs the ambient temperature determination method described in the aforementioned embodiment.

The details and effects of the MCU determining the ambient temperature may be seen with reference to the aforementioned embodiment of the ambient temperature determination method, and descriptions thereof will be omitted here.

Figure 3:
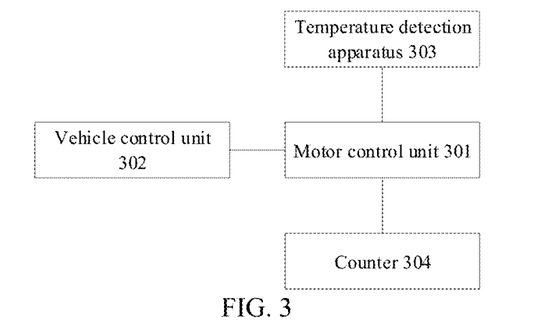
FIG. 3 is a schematic structure diagram of a control system applying an ambient temperature according to an embodiment of the present disclosure.

On this basis, yet another embodiment of the present disclosure provides a control system applying an ambient temperature. FIG. 3 is a schematic structure diagram of a control system applying an ambient temperature according to an embodiment of the present disclosure. As shown in FIG. 3, the control system may include: an MCU 301 described in the aforementioned embodiment, configured to determine an ambient temperature of a vehicle; and a vehicle control unit 302, configured to obtain the ambient temperature from the MCU to perform vehicle control.

For example, the vehicle control unit 302 performs, for example, in-vehicle temperature reduction control, ventilation control, etc. according to the ambient temperature obtained from the MCU 301. In addition, the vehicle control unit 302 may provide the MCU 301 with parameters such as a vehicle stationary time.

Preferably, the control system applying an ambient temperature may further include: a temperature detection apparatus 303, adapted to be mounted to a motor, the motor MCU and a battery for detecting a motor temperature, a battery temperature, an MCU temperature, and a coolant temperature for the same motor and transmitting the temperatures to the MCU 301. For example, the temperature detection apparatus 303 is a plurality of temperature sensors adapted to the motor, the MCU and the battery.

Preferably, the control system applying an ambient temperature may further include: a counter 304, adapted to be mounted to the MCU 301 for setting the number of a plurality of valid temperature values, obtained by the MCU 301, for the same motor. More preferably, the counter 304 may be integrated in the MCU 301.

The more implementation details and effects of the control system applying an ambient temperature may be seen with reference to the aforementioned embodiment of the ambient temperature determination method, and descriptions thereof will be omitted here.

Another embodiment of the present disclosure also provides a machine-readable storage medium having instructions stored thereon for causing a machine to perform the ambient temperature determination method described in the aforementioned embodiment.

Those skilled in the art will appreciate that the embodiments of the present disclosure may be provided as a method, a system, or a computer program product. Therefore, the present disclosure may take the form of an entirely hardware embodiment, an entirely software embodiment, or an embodiment combining software and hardware. Moreover, the present disclosure may take the form of a computer program product implemented on one or more computer-available storage media (including, but not limited to, a disk memory, a CD-ROM, an optical memory, etc.) containing computer-available program code.

The present disclosure is described with reference to flowcharts and/or block diagrams of a method, a device (system), and a computer program product according to the embodiments of the present disclosure. It should be understood that each flow and/or block in the flowcharts and/or the block diagrams and a combination of the flows and/or the blocks in the flowcharts and/or the block diagrams may be implemented via computer program instructions. These computer program instructions may be provided for a general-purpose computer, a special purpose computer, an embedded processor, or processors of other programmable data processing devices to generate a machine, whereby an apparatus for implementing functions designated in one or more flows of the flowcharts and/or one or more blocks of the block diagrams is generated via instructions executed by the computers or the processors of the other programmable data processing devices.

These computer program instructions may also be stored in a computer-readable memory capable of guiding the computers or the other programmable data processing devices to work in a specific mode, whereby a manufactured product including an instruction apparatus is generated via the instructions stored in the computer-readable memory, and the instruction apparatus implements the functions designated in one or more flows of the flowcharts and/or one or more blocks of the block diagrams.

These computer program instructions may also be loaded to the computers or the other programmable data processing devices, whereby computer-implemented processing is generated by performing a series of operation steps on the computers or the other programmable devices, and therefore the instructions executed on the computers or the other programmable devices provide a step of implementing the functions designated in one or more flows of the flowcharts and/or one or more blocks of the block diagrams.

In a typical configuration, a computing device includes one or more central processing units (CPUs), an input/output interface, a network interface, and a memory.

The memory may include a non-persistent memory, a random access memory (RAM), a non-volatile memory, and/or other forms in a computer-readable medium, such as a read only memory (ROM) or a flash RAM. The memory is an example of a computer-readable medium.

The computer-readable medium includes non-volatile and volatile, removable and non-removable media. Information may be stored in any way or by any technology. Information may be computer-readable instructions, data structures, modules of programs, or other data. Examples of a computer storage medium include, but are not limited to, a phase-change random access memory (PRAM), a static random access memory (SRAM), a dynamic random access memory (DRAM), other types of RAMs, a ROM, an electrically erasable programmable read-only memory (EEPROM), a flash memory or other memory technologies, a CD-ROM, a digital versatile disc (DVD) or other optical memories, a cassette tape, a tape and disk memory or other magnetic memories or any other non-transport media. The non-volatile storage medium may be configured to store computing device-accessible information. As defined herein, the computer-readable medium does not include computer-readable transitory media, such as modulated data signals and carrier waves.

The embodiments of the apparatus described above are merely schematic. The units illustrated as separate components may or may not be physically separated. The components shown as units may or may not be physical units, i.e., may be located in one place, or may also be distributed over a plurality of network units. Some or all of the modules may be selected to achieve the objects of the present embodiment according to actual needs. Those ordinarily skilled in the art would have been able to understand and implement the solution without paying creative work.

Various component embodiments of the present disclosure may be implemented in hardware, or in a software module executed on one or more processors, or in a combination thereof. Those skilled in the art will appreciate that a microprocessor or digital signal processor (DSP) may be used in practice to implement some or all of the functions of some or all of the components of a computing processing device according to an embodiment of the present disclosure. The present disclosure may also be implemented as device or apparatus programs (e.g., computer programs and computer program products) for performing a part or all of the methods described here. Such programs implementing the present disclosure may be stored on a computer-readable medium or may be in the form of one or more signals. Such signals may be downloaded from an Internet website, provided on a carrier signal, or provided in any other form.

Figure 4:
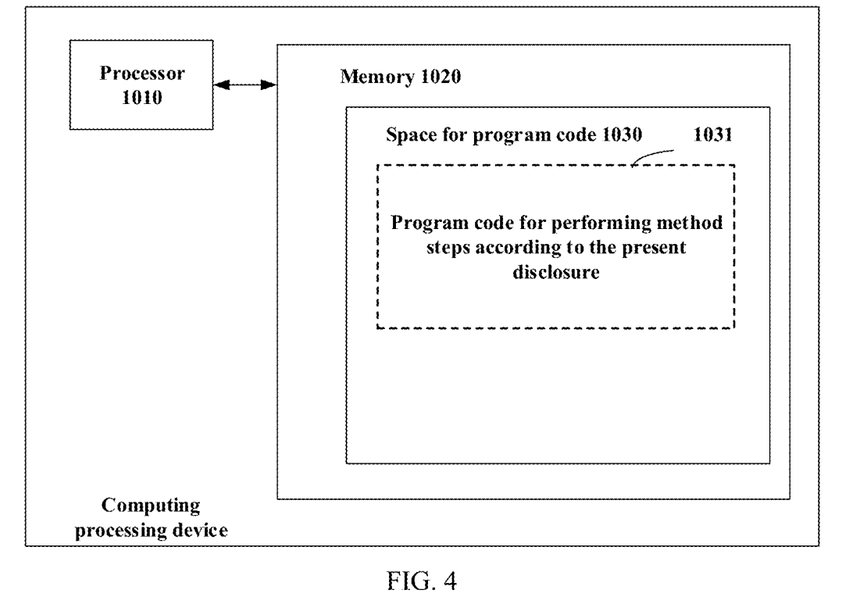
FIG. 4 schematically shows a block diagram of a computing processing device for performing a method according to the present disclosure.
Figure 5:
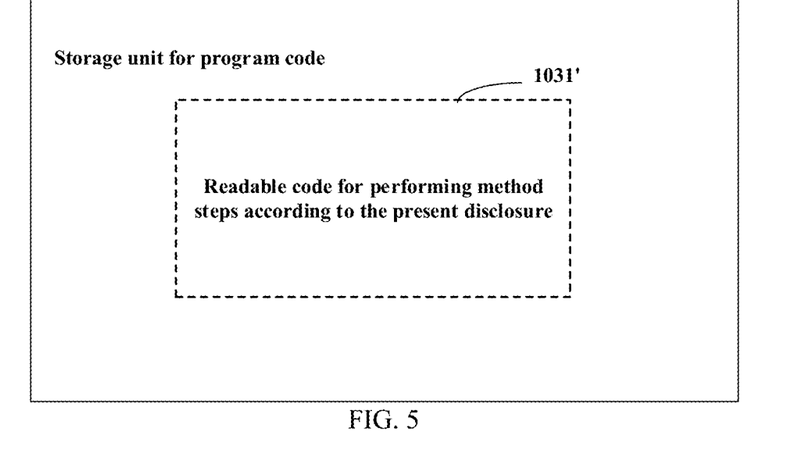
FIG. 5 schematically shows a storage unit for holding or carrying program code implementing a method according to the present disclosure.

For example, FIG. 4 shows a computing processing device that may implement a method according to the present disclosure. The computing processing device conventionally includes a processor 1010 and a computer program product or computer-readable medium in the form of a memory 1020. The memory 1020 may be an electronic memory such as a flash memory, an EEPROM, an EPROM, a hard disk, or a ROM. The memory 1020 has a storage space 1030 for program code 1031 for performing any of the method steps described above. For example, the storage space 1030 for program code may include respective program code 1031 for implementing various steps in the above method, respectively. The program code may be read from or written to one or more computer program products. These computer program products include a program code carrier such as a hard disk, a compact disc (CD), a memory card, or a floppy disk. Such computer program products are typically portable or fixed storage units as described with reference to FIG. 5. The storage unit may have storage segments, storage spaces, etc. arranged similarly to the memory 1020 in the computing processing device of FIG. 4. The program code may, for example, be compressed in a suitable form. The memory unit typically includes computer-readable code 1031', i.e., code that may be read by a processor, such as 1010. When executed by the computing processing device, the code causes the computing processing device to perform the various steps in the methods described above.

"One embodiment", "embodiment", or "one or more embodiments" referred to herein means that a particular feature, structure, or characteristic described in connection with the embodiment is included in at least one embodiment of the present disclosure. Furthermore, it should be noted that instances of the phrase "in one embodiment" here are not necessarily all referring to the same embodiment.

In the description provided herein, numerous specific details are set forth. However, it will be appreciated that the embodiments of the present disclosure may be practiced without these specific details. In some instances, well-known methods, structures and technologies have not been shown in detail in order not to obscure the understanding of this description.

It should also be noted that the terms "including", "comprising" or any other variations thereof are intended to cover a non-exclusive inclusion, such that a process, method, article, or device including a series of elements not only includes those elements, but also includes other elements that are not explicitly listed, or also includes elements inherent to such process, method, article, or device. It is not excluded, without more constraints, that additional identical elements exist in the process, method, article, or device including elements defined by a sentence "including a . . . ".

The above are merely the embodiments of the present disclosure and are not intended to limit the present disclosure. Various modifications and variations of the present disclosure will occur to those skilled in the art. Any modifications, equivalent replacements, improvements, etc. that come within the spirit and principles of the present disclosure are intended to be within the scope of the claims appended hereto.

The invention claimed is:

1. An ambient temperature determination method, applied to a motor control unit (MCU) of a vehicle, the ambient temperature determination method comprising:

by one or more processors, when the vehicle is in a high-voltage power-on state, obtaining a plurality of valid temperature values for a motor system: a valid motor temperature value, a valid battery temperature value, a valid MCU temperature value, and a valid coolant temperature value, wherein the valid temperature values refer to temperature values obtained after filtering out obviously erroneous detected temperature values, wherein the valid motor temperature value refers to a temperature value of a motor after filtering out obviously erroneous detected temperature values of the motor, the valid battery temperature value refers to a temperature value of a battery after filtering out obviously erroneous detected temperature values of the battery, the valid MCU temperature value refers to a temperature value of the motor control unit after filtering out obviously erroneous detected temperature values of the motor control unit, and the valid coolant temperature value refers to a temperature value of a coolant after filtering out obviously erroneous detected temperature values of the coolant;

by one or more processors, determining a corresponding initial temperature value according to each of the valid temperature values, comprising: an initial motor temperature value, an initial battery temperature value, an initial MCU temperature value, and an initial coolant temperature value;

by one or more processors, determining a minimum value among all the initial temperature values as an initial ambient temperature;

by one or more processors, when the vehicle is in a driving state and each of the initial temperature values is less than or equal to a corresponding threshold, obtaining a current motor temperature and a current coolant temperature in real time, and when the current motor temperature no longer rises, calculating a motor temperature difference between the current motor temperature and the corresponding initial temperature value and a coolant temperature difference between the current coolant temperature and the corresponding initial temperature value;

by one or more processors, calculating a temperature calibration for an ambient temperature according to the motor temperature difference and the coolant temperature difference, a pre-configured association relationship exists between the motor temperature difference, the coolant temperature difference and the temperature calibration; and by one or more processors, calculating a current ambient temperature on the basis of the temperature calibration and the initial ambient temperature.

2. The ambient temperature determination method according to claim 1, wherein obtaining the plurality of valid temperature values for the motor system comprises:
obtaining the plurality of valid temperature values within a set time;
when the vehicle is in the high-voltage power-on state, enabling a preset counter to obtain the plurality of valid temperature values consistent with a set count of the counter; or
when the vehicle is in the high-voltage power-on state, obtaining a vehicle stationary time from a vehicle control unit, so as to obtain the plurality of valid temperature values within the vehicle stationary time.

3. The ambient temperature determination method according to claim 1, wherein determining the corresponding initial temperature value according to each of the valid temperature values comprises:
calculating an average value of the obtained valid temperature values as the initial motor temperature value, the initial battery temperature value, the initial MCU temperature value, and the initial coolant temperature value, respectively.

4. The ambient temperature determination method according to claim 1, wherein the association relationship exists between the motor temperature difference, the coolant temperature difference and the temperature calibration is pre-configured by the following equation:

$$Temp_{err} = (TM_{temperr} - K \times CW_{temperr}) \times \begin{bmatrix} K_1 & K_2 \\ K_3 & K_4 \end{bmatrix}$$

where $Temp_{err}$ represents the temperature calibration, $TM_{temperr}$ represents the motor temperature difference, $CW_{temperr}$ represents the coolant temperature difference, K is a weight coefficient, and $$\begin{bmatrix} K_1 & K_2 \\ K_3 & K_4 \end{bmatrix}$$

is a calibration parameter in different temperature ranges.

5. The ambient temperature determination method according to claim 1 further comprising:
calculating an ambient temperature difference between the current ambient temperature and the initial ambient temperature; and
when the ambient temperature difference is greater than a set threshold, determining a previous ambient temperature corresponding to the current ambient temperature as a finally determined ambient temperature.

6. A machine-readable storage medium having instructions stored thereon for causing a machine to perform the ambient temperature determination method according to claim 1.

7. A computing processing device, comprising:
a memory having computer-readable code stored therein; and
one or more processors, wherein when the computer-readable code is executed by the one or more processors, the computing processing device performs the ambient temperature determination method according to claim 1.

8. A motor control unit (MCU), wherein the motor control unit (MCU) is configured for executing a program which, when executed, performs an ambient temperature determination method, which is applied to a motor control unit (MCU) of a vehicle, the ambient temperature determination method comprising:
when the vehicle is in a high-voltage power-on state, acquiring a plurality of valid temperature values for a motor system: a valid motor temperature value, a valid battery temperature value, a valid MCU temperature value, and a valid coolant temperature value, wherein the valid temperature values refer to temperature values obtained after filtering out obviously erroneous detected temperature values, wherein the valid motor temperature value refers to a temperature value of a motor after filtering out obviously erroneous detected temperature values of the motor, the valid battery temperature value refers to a temperature value of a battery after filtering out obviously erroneous detected temperature values of the battery, the valid MCU temperature value refers to a temperature value of the motor control unit after filtering out obviously erroneous detected temperature values of the motor control unit, and the valid coolant temperature value refers to a temperature value of a coolant after filtering out obviously erroneous detected temperature values of the coolant;
determining a corresponding initial temperature value according to each of the valid temperature values, comprising: an initial motor temperature value, an initial battery temperature value, an initial MCU temperature value, and an initial coolant temperature value;
determining a minimum value among all the initial temperature values as an initial ambient temperature;
when the vehicle is in a driving state and each of the initial temperature values is less than or equal to a corresponding threshold, obtaining a current motor temperature and a current coolant temperature in real time, and when the current motor temperature no longer rises, calculating a motor temperature difference between the current motor temperature and the corresponding initial temperature value and a coolant temperature difference between the current coolant temperature and the corresponding initial temperature value;
calculating a temperature calibration for an ambient temperature according to the motor temperature difference and the coolant temperature difference, a pre-configured association relationship exists between the motor temperature difference, the coolant temperature difference and the temperature calibration; and
calculating a current ambient temperature on the basis of the temperature calibration and the initial ambient temperature.

9. A control system applying an ambient temperature, comprising:
a motor control unit (MCU) according to claim 8, configured to determine an ambient temperature of a vehicle; and
a vehicle control unit, configured to obtain the ambient temperature from the MCU to perform vehicle control.

10. The control system applying an ambient temperature according to claim 9, wherein the system further comprises:
a temperature detection apparatus, adapted to be mounted to the motor, the motor MCU and the battery, and configured for detecting a motor temperature, a battery temperature, an MCU temperature, and a coolant temperature for the motor and transmitting the temperatures to the MCU.

11. The control system applying an ambient temperature according to claim 9, wherein the system further comprises:
a counter, adapted to be mounted to the MCU for setting a number of the plurality of valid temperature values for the motor obtained by the MCU.

12. The motor control unit (MCU) according to claim 8, wherein the obtaining the plurality of valid temperature values for the motor system comprises:
obtaining the plurality of valid temperature values within a set time;
when the vehicle is in the high-voltage power-on state, enabling a preset counter to obtain the plurality of valid temperature values consistent with a set count of the counter; or
when the vehicle is in the high-voltage power-on state, obtaining a vehicle stationary time from a vehicle control unit, so as to obtain the plurality of valid temperature values within the vehicle stationary time.

13. The motor control unit (MCU) according to claim 8, wherein determining the corresponding initial temperature value according to each of the valid temperature values comprises:
calculating an average value of the obtained valid temperature values as the initial motor temperature value, the initial battery temperature value, the initial MCU temperature value, and the initial coolant temperature value, respectively.

14. The motor control unit (MCU) according to claim 8, wherein the association relationship exists between the motor temperature difference, the coolant temperature difference and the temperature calibration is pre-configured by the following equation:

$$Temp_{err} = (TM_{temperr} - K \times CW_{temperr}) \times \begin{bmatrix} K_1 & K_2 \\ K_3 & K_4 \end{bmatrix}$$

where $Temp_{err}$ represents the temperature calibration, $TM_{temperr}$ represents the motor temperature difference, $CW_{temperr}$ represents the coolant temperature difference, K is a weight coefficient, and $$\begin{bmatrix} K_1 & K_2 \\ K_3 & K_4 \end{bmatrix}$$

is a calibration parameter in different temperature ranges.

15. The motor control unit (MCU) according to claim 8 further comprising:
calculating an ambient temperature difference between the current ambient temperature and the initial ambient temperature; and
when the ambient temperature difference is greater than a set threshold, determining a previous ambient temperature corresponding to the current ambient temperature as a finally determined ambient temperature.

* * * * *